US009928701B2

(12) United States Patent
Levesque et al.

(10) Patent No.: US 9,928,701 B2
(45) Date of Patent: Mar. 27, 2018

(54) METHOD AND SYSTEM FOR PROVIDING HAPTIC EFFECTS BASED ON INFORMATION COMPLEMENTARY TO MULTIMEDIA CONTENT

(71) Applicant: Immersion Corporation, San Jose, CA (US)

(72) Inventors: Vincent Levesque, Montreal (CA); Ali Modarres, Montreal (CA); Juan Manuel Cruz-Hernandez, Montreal (CA); Jamal Saboune, Montreal (CA)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 15/479,398

(22) Filed: Apr. 5, 2017

(65) Prior Publication Data

US 2017/0206755 A1  Jul. 20, 2017

Related U.S. Application Data

(63) Continuation of application No. 14/145,650, filed on Dec. 31, 2013, now Pat. No. 9,652,945.

(Continued)

(51) Int. Cl.
*G08B 6/00* (2006.01)
*G09B 21/00* (2006.01)
(Continued)

(52) U.S. Cl.
CPC ............ *G08B 6/00* (2013.01); *G06F 3/016* (2013.01); *G06F 3/165* (2013.01);
(Continued)

(58) Field of Classification Search
CPC .......... G08B 6/00; G06F 3/016; G06F 3/005; G06F 3/011; G06F 1/163; G06F 19/322;
(Continued)

(56) References Cited

U.S. PATENT DOCUMENTS 4,250,637 A    2/1981  Scott
5,056,251 A   11/1991  Shuhart, Jr.
(Continued)

FOREIGN PATENT DOCUMENTS

EP          2 624 099       8/2013
WO        2003/032289      4/2003
(Continued)

OTHER PUBLICATIONS

U.S. Appl. No. 14/078,438, Advisory Action dated Apr. 25, 2016, 4 pages.
(Continued)

*Primary Examiner* — Hoi Lau
(74) *Attorney, Agent, or Firm* — Kilpatrick Townsend & Stockton LLP

(57) ABSTRACT

The present disclosure is generally directed to systems and methods for providing haptic effects based on information complementary to multimedia content. For example, one disclosed method includes the steps of receiving multimedia data comprising multimedia content and complementary data, wherein the complementary data describes the multimedia content, determining a haptic effect based at least in part on the complementary data, and outputting the haptic effect while playing the multimedia content.

20 Claims, 6 Drawing Sheets

Related U.S. Application Data

(60) Provisional application No. 61/874,933, filed on Sep. 6, 2013.

(51) Int. Cl.
  *H04B 3/36* (2006.01)
  *G06F 3/16* (2006.01)
  *H04N 21/432* (2011.01)
  *H04N 21/439* (2011.01)
  *H04N 21/84* (2011.01)
  *H04N 21/488* (2011.01)
  *G06F 3/01* (2006.01)

(52) U.S. Cl.
  CPC ..... *H04N 21/4325* (2013.01); *H04N 21/4394* (2013.01); *H04N 21/4884* (2013.01); *H04N 21/84* (2013.01)

(58) Field of Classification Search
  CPC . G06F 19/3418; G06F 19/345; G09B 21/003; G09B 21/00; A61F 4/00; H04N 21/235
  USPC ......... 340/4.12, 407.1, 407.2, 7.6; 345/156, 345/173; 707/769; 715/702; 386/239, 386/E09.011
  See application file for complete search history.

(56) References Cited

U.S. PATENT DOCUMENTS

| | | | |
|---|---|---|---|
| 5,388,992 A * | 2/1995 | Franklin | G06F 3/016 340/407.1 |
| 6,650,338 B1 * | 11/2003 | Kolarov | G06F 3/016 345/619 |
| 7,208,671 B2 | 4/2007 | Chu et al. | |
| 7,757,171 B1 | 7/2010 | Wong et al. | |
| 8,493,354 B1 * | 7/2013 | Birnbaum | G06F 3/016 340/407.2 |
| 8,593,420 B1 * | 11/2013 | Buuck | G06F 3/016 345/173 |
| 8,754,758 B1 * | 6/2014 | Ullrich | G06F 3/016 340/407.1 |
| 8,798,534 B2 * | 8/2014 | Rodriguez | H04N 21/44008 340/407.2 |
| 8,896,524 B2 * | 11/2014 | Birnbaum | G06F 3/016 345/156 |
| 8,976,980 B2 | 3/2015 | Hashimoto et al. | |
| 2002/0151992 A1 | 10/2002 | Hoffberg et al. | |
| 2002/0178012 A1 * | 11/2002 | Wang | G10H 1/0058 704/503 |
| 2003/0067440 A1 * | 4/2003 | Rank | G06F 3/016 345/156 |
| 2003/0068053 A1 * | 4/2003 | Chu | G06F 3/016 381/118 |
| 2003/0188020 A1 * | 10/2003 | Barile | G06Q 30/06 709/245 |
| 2004/0031058 A1 | 2/2004 | Reisman | |
| 2004/0161118 A1 * | 8/2004 | Chu | G06F 3/016 381/61 |
| 2004/0252851 A1 | 12/2004 | Braun | |
| 2005/0223237 A1 | 10/2005 | Barletta et al. | |
| 2007/0178942 A1 | 8/2007 | Sadler et al. | |
| 2007/0242040 A1 * | 10/2007 | Ullrich | G06F 3/016 345/157 |
| 2008/0098331 A1 | 4/2008 | Novick et al. | |
| 2008/0165081 A1 | 7/2008 | Lawther et al. | |
| 2009/0049092 A1 | 2/2009 | Capio et al. | |
| 2009/0096632 A1 | 4/2009 | Ullrich et al. | |
| 2009/0128306 A1 * | 5/2009 | Luden | G06F 3/016 340/407.1 |
| 2009/0231276 A1 * | 9/2009 | Ullrich | G06F 3/016 345/157 |
| 2009/0306985 A1 * | 12/2009 | Roberts | G10L 13/043 704/258 |
| 2009/0327894 A1 | 12/2009 | Rakib et al. | |
| 2010/0013653 A1 | 1/2010 | Birnbaum et al. | |
| 2010/0153995 A1 | 6/2010 | Belz et al. | |
| 2010/0217413 A1 * | 8/2010 | Seiler | H04R 3/12 700/94 |
| 2010/0268745 A1 * | 10/2010 | Choi | G11B 27/105 707/802 |
| 2010/0274817 A1 * | 10/2010 | Choi | G06F 17/30265 707/802 |
| 2010/0278512 A1 * | 11/2010 | Ryu | G06F 3/014 386/239 |
| 2011/0018697 A1 | 1/2011 | Birnbaum et al. | |
| 2011/0063208 A1 * | 3/2011 | Van Den Eerenbeemd | G06F 3/011 345/156 |
| 2011/0093100 A1 | 4/2011 | Ramsay et al. | |
| 2011/0102160 A1 | 5/2011 | Heubel et al. | |
| 2011/0125787 A1 * | 5/2011 | Choi | G11B 27/034 707/769 |
| 2011/0125788 A1 * | 5/2011 | Joo | G11B 27/034 707/769 |
| 2011/0125789 A1 * | 5/2011 | Joo | G06F 3/011 707/769 |
| 2011/0125790 A1 * | 5/2011 | Choi | G11B 27/034 707/769 |
| 2011/0128132 A1 * | 6/2011 | Ullrich | G08B 6/00 340/407.1 |
| 2011/0137137 A1 | 6/2011 | Shin et al. | |
| 2011/0153768 A1 | 6/2011 | Carter et al. | |
| 2011/0169908 A1 | 7/2011 | Lee et al. | |
| 2011/0188832 A1 * | 8/2011 | Choi | H04N 21/235 386/239 |
| 2011/0216179 A1 * | 9/2011 | Dialameh | G06F 17/30247 348/62 |
| 2011/0254671 A1 | 10/2011 | Okimoto et al. | |
| 2012/0019352 A1 | 1/2012 | Menard et al. | |
| 2012/0021389 A1 | 1/2012 | Wakamoto | |
| 2012/0028577 A1 * | 2/2012 | Rodriguez | H04N 21/44008 455/41.1 |
| 2012/0032906 A1 * | 2/2012 | Lemmens | G06F 3/011 345/173 |
| 2012/0059697 A1 * | 3/2012 | Lin | G06Q 30/02 705/14.4 |
| 2012/0070085 A1 | 3/2012 | Am | |
| 2012/0093216 A1 | 4/2012 | Black | |
| 2012/0150928 A1 * | 6/2012 | Ward | G06F 17/30038 707/825 |
| 2012/0200520 A1 | 8/2012 | Harris | |
| 2012/0206246 A1 * | 8/2012 | Cruz-Hernandez | G06F 3/016 340/407.1 |
| 2012/0206247 A1 * | 8/2012 | Bhatia | G06F 3/016 340/407.1 |
| 2012/0216666 A1 * | 8/2012 | Fresolone | G09B 21/009 84/483.2 |
| 2012/0245721 A1 * | 9/2012 | Story, Jr. | G06F 3/04842 700/94 |
| 2012/0268412 A1 * | 10/2012 | Cruz-Hernandez | G06F 3/0488 345/174 |
| 2012/0306631 A1 * | 12/2012 | Hughes | H04M 19/047 340/407.1 |
| 2013/0044049 A1 * | 2/2013 | Biggs | G06F 3/016 345/156 |
| 2013/0063256 A1 | 3/2013 | Tartz et al. | |
| 2013/0086178 A1 | 4/2013 | Osborne et al. | |
| 2013/0155110 A1 * | 6/2013 | Wu | G06T 1/00 345/634 |
| 2013/0163785 A1 * | 6/2013 | Lee | H03J 7/00 381/103 |
| 2013/0227410 A1 * | 8/2013 | Sridhara | H04N 21/235 715/702 |
| 2013/0229271 A1 | 9/2013 | Fantauzza | |
| 2013/0245980 A1 | 9/2013 | Forbes et al. | |
| 2013/0265270 A1 * | 10/2013 | Tempas | A61H 23/02 345/174 |
| 2013/0265286 A1 * | 10/2013 | Da Costa | G06F 3/016 345/177 |

(56) References Cited

U.S. PATENT DOCUMENTS

| | | | |
|---|---|---|---|
| 2013/0265502 A1* | 10/2013 | Huebner | G06T 15/20 348/789 |
| 2013/0278536 A1* | 10/2013 | Nakamura | G06F 3/016 345/173 |
| 2013/0307786 A1 | 11/2013 | Heubel | |
| 2013/0311881 A1 | 11/2013 | Birnbaum et al. | |
| 2013/0314514 A1* | 11/2013 | Mochinaga | H04N 13/0429 348/54 |
| 2013/0325456 A1 | 12/2013 | Takagi et al. | |
| 2013/0326552 A1 | 12/2013 | Adams | |
| 2014/0039796 A1 | 2/2014 | Thompson et al. | |
| 2014/0055358 A1* | 2/2014 | Birnbaum | G06F 3/016 345/168 |
| 2014/0118125 A1* | 5/2014 | Bhatia | G06F 3/016 340/407.1 |
| 2014/0176415 A1* | 6/2014 | Buuck | G06F 3/016 345/156 |
| 2014/0179439 A1* | 6/2014 | Miura | A63F 13/12 463/42 |
| 2014/0205260 A1* | 7/2014 | Lacroix | H04N 5/765 386/201 |
| 2014/0215380 A1* | 7/2014 | Kang | G06F 3/0483 715/781 |
| 2014/0237495 A1* | 8/2014 | Jang | H04N 21/44218 725/12 |
| 2014/0267911 A1 | 9/2014 | Grant et al. | |
| 2014/0270681 A1* | 9/2014 | Sen | G11B 31/00 386/201 |
| 2014/0347177 A1* | 11/2014 | Phan | H04N 21/234336 340/407.1 |
| 2014/0368349 A1* | 12/2014 | Ostyn | A63J 1/00 340/815.45 |
| 2015/0070146 A1 | 3/2015 | Cruz-Hernandez et al. | |
| 2015/0070147 A1 | 3/2015 | Cruz-Hernandez et al. | |
| 2015/0070148 A1 | 3/2015 | Cruz-Hernandez et al. | |
| 2015/0070150 A1* | 3/2015 | Levesque | G06F 3/016 340/407.1 |
| 2015/0070265 A1* | 3/2015 | Cruz-Hernandez | G10L 21/06 345/156 |
| 2015/0097658 A1 | 4/2015 | Yagi et al. | |
| 2015/0199015 A1* | 7/2015 | Ullrich | H04N 9/8205 345/156 |

FOREIGN PATENT DOCUMENTS

| | | |
|---|---|---|
| WO | 2004/030341 | 4/2004 |
| WO | 2005/048541 | 5/2005 |
| WO | 2009/051976 | 4/2009 |
| WO | 2013/096327 | 6/2013 |

OTHER PUBLICATIONS

U.S. Appl. No. 14/078,438, Final Office Action dated Feb. 4, 2016, 43 pages.
U.S. Appl. No. 14/078,438, Non Final Office Action dated Oct. 6, 2016, 56 pages.
U.S. Appl. No. 14/078,438 Non-Final Office Action dated Jul. 16, 2015, 31 pages.
U.S. Appl. No. 14/078,442, Advisory Action dated Mar. 16, 2016, 5 pages.
U.S. Appl. No. 14/078,442, Final Office Action dated Jan. 6, 2016, 33 pages.
U.S. Appl. No. 14/078,442, Non-Final Office Action dated Apr. 3, 2015, 22 pages.
U.S. Appl. No. 14/078,442, Non-Final Office Action dated Sep. 14, 2015, 26 pages.
U.S. Appl. No. 14/078,442, Non-Final Office Action dated May 27, 2016, 29 pages.
U.S. Appl. No. 14/078,445, Advisory Action dated Feb. 10, 2016, 6 pages.
U.S. Appl. No. 14/078,445, Final Office Action dated Nov. 18, 2015, 19 pages.
U.S. Appl. No. 14/078,445, Final Office Action dated Oct. 25, 2016, 24 pages.
U.S. Appl. No. 14/078,445, Non-Final Office Action dated Jul. 20, 2015, 17 pages.
U.S. Appl. No. 14/078,445, Non-Final Office Action dated May 26, 2016, 26 pages.
European Patent Application 14183978.7, Extended European Search Report dated Mar. 20, 2015, 7 pages.
European Patent Application 14183980.3, Extended European Search Report dated Mar. 31, 2015, 7 pages.
European Patent Application 14183981.1, Extended European Search Report dated Mar. 25, 2015, 7 pages.
European Patent Application 14183983.7, Extended European Search Report dated Apr. 9, 2015, 7 pages.
Lee , J. et al., "Haptic Interaction with user Manipulation for Smartphone", Consumer Electronics (ICCE), 2013 IEEE International Conference, Jan. 11, 2013, pp. 47-48, XP 032348660.

* cited by examiner

METHOD AND SYSTEM FOR PROVIDING HAPTIC EFFECTS BASED ON INFORMATION COMPLEMENTARY TO MULTIMEDIA CONTENT

REFERENCE TO RELATED APPLICATION

This application is a continuation application of and claims priority to co-pending U.S. application Ser. No. 14/145,650, filed Dec. 31, 2013, entitled "Method and System for Providing Haptic Effects Based on Information Complementary to Multimedia Content," which claims priority to U.S. Provisional Patent Application No. 61/874,933, filed Sep. 6, 2013, entitled "Audio to Haptics," the entirety of all of which is hereby incorporated herein by reference.

This application is related to U.S. patent application Ser. No. 14/078,438, entitled "Systems and Methods for Generating Haptic Effects Associated with Transitions in Audio Signals," filed Nov. 12, 2013, the entirety of which is hereby incorporated herein by reference.

This application is related to U.S. patent application Ser. No. 14/078,442, entitled "Systems and Methods for Generating Haptic Effects Associated with an Envelope in Audio Signals," filed Nov. 12, 2013, the entirety of which is hereby incorporated herein by reference.

This patent application is related to U.S. patent application Ser. No. 14/078,445, entitled "Systems and Methods for Generating Haptic Effects Associated with Audio Signals," filed Nov. 12, 2013, the entirety of which is hereby incorporated herein by reference.

FIELD

The present disclosure generally relates to methods and systems for providing haptic effects based on multimedia data, and more particularly to methods and systems for providing haptic effects based on information complementary to multimedia content.

BACKGROUND

Advances in multimedia technology over recent years have continuously served to enhance and provide a more immersive viewing experience for users. Today's televisions have larger screens, high-definition screen resolutions, and 3D capabilities. In addition, handheld devices now regularly have high resolution screens with vibrant colors and access to numerous sources of content through the Internet. Similarly, advancements in audio technologies such as improved surround sound systems, higher fidelity home theater speakers, and high definition audio further enhance users' multimedia viewing experience. In addition to advancements in video and audio technologies, haptic effects are used to further immerse users in the viewing experience through the viewers' sense of touch. Haptically-enabled video game console controllers that provide haptic effects corresponding to events in a video game are pervasive examples of the use of haptics to enhance user experience. Similarly, most handheld mobile devices (e.g., cell phones, tablet computers) today contain hardware that permits applications to provide haptic effects.

Employing haptics to enhance the playback of audio and/or video content is also well known. In some cases, haptic designers compile haptic tracks—a specific set of haptic effects to be output at particular times during the playback of the multimedia content—that are used by systems or devices playing the multimedia file to provide haptic effects. While an advantage of this method is that it yields haptic tracks specifically tailored to the multimedia content, it requires employing a haptic designer to manually design haptic tracks for each multimedia content item. Alternatives to manual design include automated processes that use algorithms to analyze the audio and/or video content to determine haptic effects to be output. Examples of such techniques include Acoustic Event Detection ("AED"), described in above-referenced U.S. patent application Ser. No. 14/078,445, Blind Source Separation ("BSS"), also described in above-referenced U.S. patent application Ser. No. 14/078,445, and image pattern matching. However, these known automated haptification algorithms suffer from inaccuracy and heavy processing requirements. In addition, the automated haptification algorithms also have a tendency to be over-inclusive—haptifying events that are not desirable and often result in an overly noisy haptic track (e.g., typing on a keyboard, shouting, music)—and under-inclusive—failing to haptify key events in the multimedia content.

SUMMARY

The present disclosure is generally directed to a method comprising receiving multimedia data comprising multimedia content and complementary data, wherein the complementary data describes the multimedia content, determining a haptic effect based at least in part on the complementary data, and outputting the haptic effect while playing the multimedia content. In another embodiment, a computer readable medium comprises program code for causing a processor to perform such a method.

These illustrative embodiments are mentioned not to limit or define the invention, but to provide examples to aid understanding thereof. Illustrative embodiments are discussed in the Detailed Description and further description of the invention is provided therein. Advantages offered by various embodiments of this invention may be further understood by examining this specification.

BRIEF DESCRIPTION OF THE DRAWINGS

These and other features, aspects, and advantages according to the present disclosure are better understood when the following Detailed Description is read with reference to the accompanying figures, wherein.

DETAILED DESCRIPTION

Embodiments according to this disclosure provide methods and systems for providing haptic effects based on multimedia data, and more particularly to methods and systems for providing haptic effects based on information complementary to multimedia content (referred to hereinafter as "complementary information"). As used herein, "multimedia data" comprises both multimedia content and complementary information.

Illustrative Embodiment

In one illustrative embodiment, a family has a home theater system comprising a television, an Internet-capable and a haptic-enabled A/V receiver, speakers, and a haptic couch. The family regularly watches movies using an Internet-based movie streaming service through which the A/V receiver receives a multimedia data stream comprising a selected movie as well as complementary information (e.g. metadata tags, closed caption information) for that movie. In one particular instance, the family chooses to watch a World War I action/drama film. As the data stream for the movie begins to arrive, the A/V receiver determines that a metadata container, commonly known as a tag, is present. Analyzing the tag, the A/V receiver determines the presence of the text "war" in a genre field of the tag and, based on the genre, determines that a haptic theme increasing the intensity of the output of haptic effects above a default level will be applied. In addition, the A/V receiver provides the genre to an automated haptification algorithm that analyzes the audio and video tracks of the movie to identify patterns for which to generate haptic effects. In the present example, the A/V receiver focuses on patterns typically found in war films, such as explosions, gunfire, and the like and generates haptic effects based on the algorithm. In addition to analyzing the audio and video tracks, the A/V receiver also analyzes closed caption text for keywords. For example, if the A/V receiver finds the word "explosion" at a particular timestamp in the closed caption data, the A/V receiver inputs this information into the automated algorithm. The algorithm then looks for an explosion pattern around that timestamp and generates a corresponding haptic effect, such as an intense vibration, to correspond with the explosion. As the movie plays, the A/V receiver sends signals to the haptic sofa causing it to output the haptic effects at times corresponding to events occurring within the film.

This illustrative embodiment is merely an example, and multiple other embodiments of the present invention may be implemented as described herein.

Illustrative Device

Figure 1A:
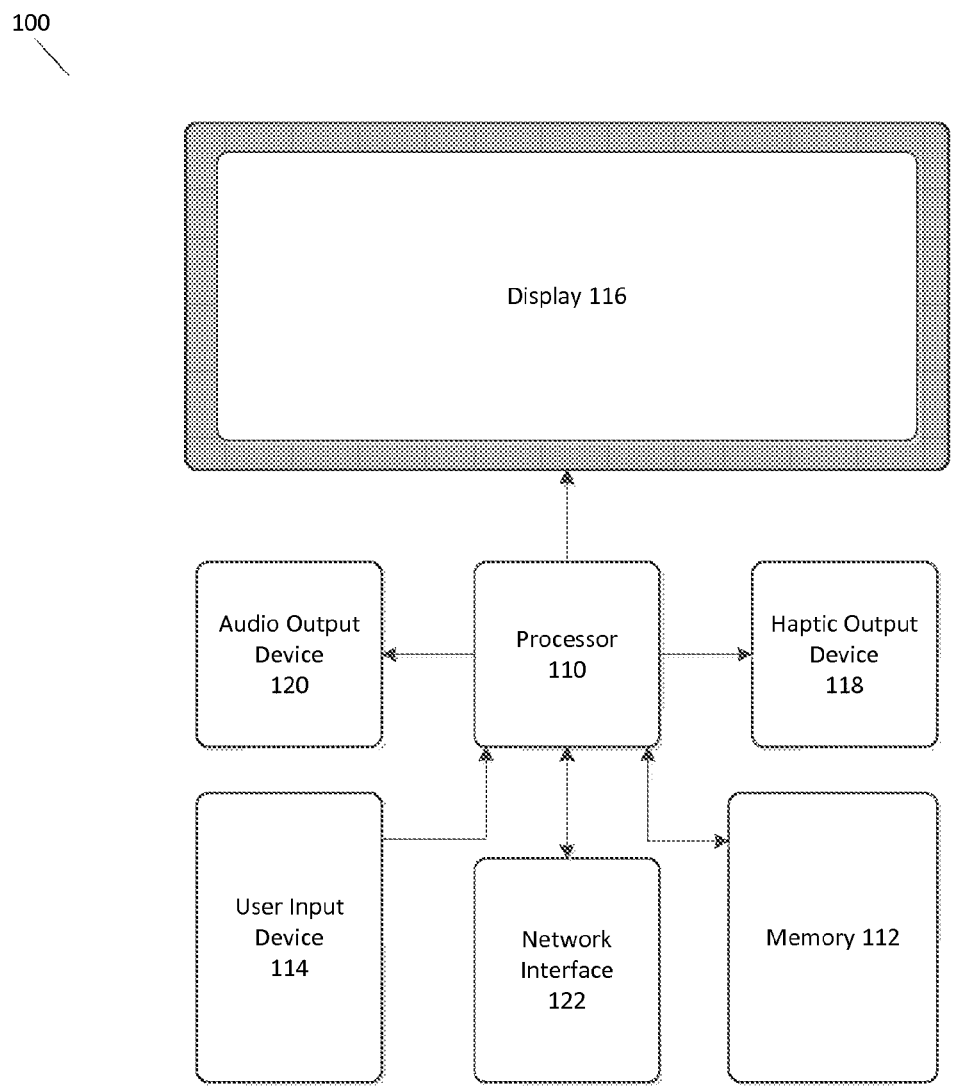
FIGS. 1A and 1B are block system diagrams according to embodiments of the present disclosure.
Figure 1B:
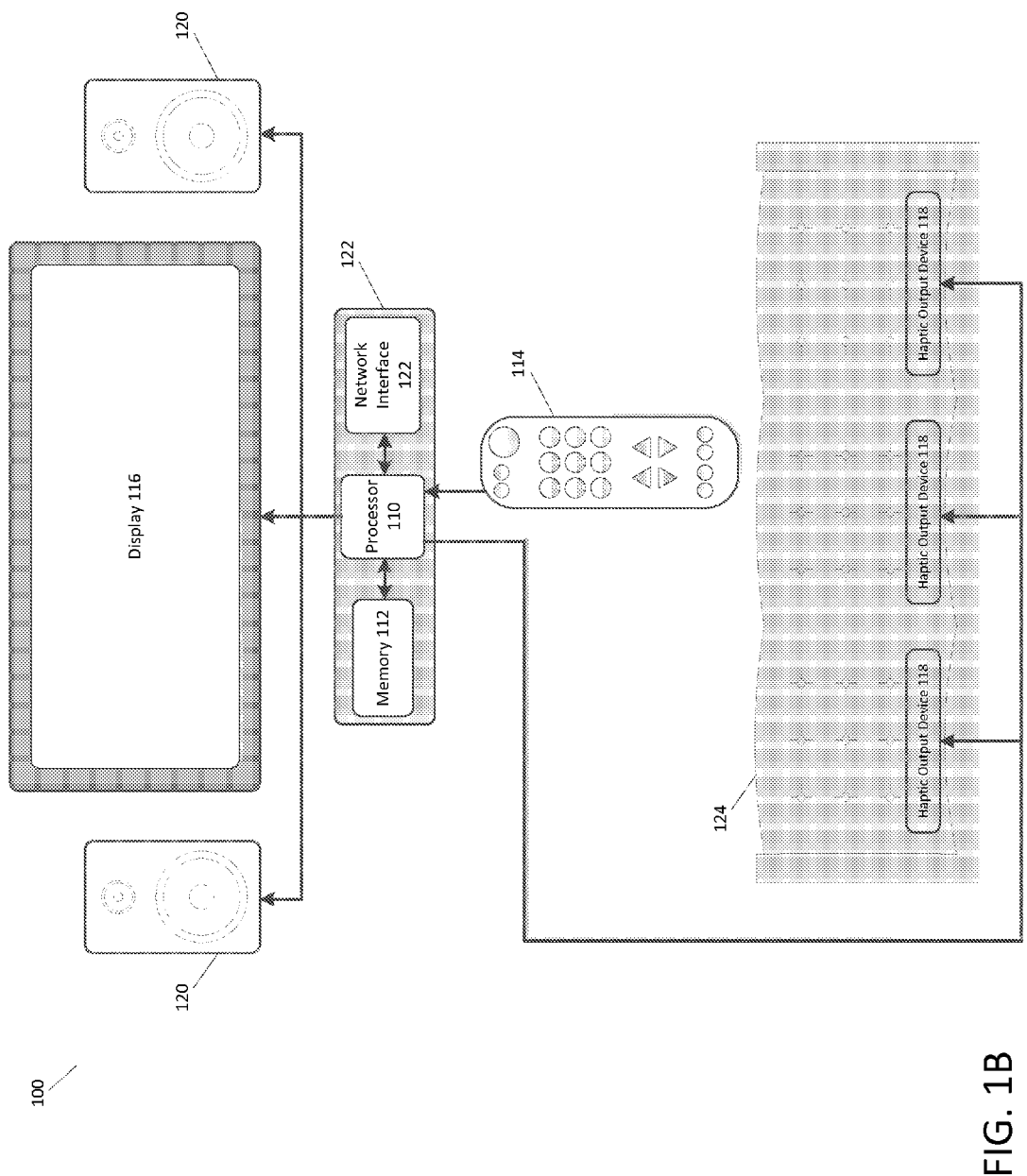

Referring now to the drawings in which like numerals indicate like elements throughout the several figures, FIGS. 1A and 1B are block diagrams of systems for providing haptic effects based on complementary information according to embodiments of the disclosure.

FIG. 1A depicts a system 100 comprising the various components. In some embodiments, the system 100 shown in FIG. 1A is a home entertainment system comprising a television, an A/V receiver, a plurality of speakers, a gaming console with gaming controllers, a universal remote control, haptically-enabled furniture, and/or wearable haptic output devices. In one particular embodiment, depicted by FIG. 1B, system 100 comprises a television (display 116), an A/V receiver 122, speakers 120, a remote control 114, and a haptically-enabled couch 124. In other embodiments, system 100 comprises a handheld device, such as a mobile phone, a personal digital assistant (PDA), tablet computer, laptop computer, palmtop computer, or a handheld navigation system. In still other embodiments, system 100 may comprise a kiosk, an automotive head unit, or similar systems.

Embodiments of the present disclosure can be implemented in combination with, or may comprise combinations of: digital electronic circuitry, computer hardware, firmware, and software. The system 100 shown in FIGS. 1A and 1B comprises a processor 110. The processor 110 receives input signals and generates signals for communication, display, and providing haptic feedback. The processor 110 includes or is in communication with one or more computer-readable media, such as memory 112, which may comprise random access memory (RAM).

The processor 110 executes computer-executable program instructions stored in memory 112, such as executing one or more computer programs for messaging or for generating haptic feedback. Processor 110 may comprise a microprocessor, a digital signal processor (DSP), an application-specific integrated circuit (ASIC), one or more field programmable gate arrays (FPGAs), or state machines. The processor may further comprise a programmable electronic device such as a PLC, a programmable interrupt controller (PIC), a programmable logic device (PLD), a programmable read-only memory (PROM), an electronically programmable read-only memory (EPROM or EEPROM), or other similar devices.

Memory 112 comprises a computer-readable media that may store instructions, which, when executed by the processor 110, cause it to perform various steps, such as those described herein. Embodiments of computer-readable media may comprise, but are not limited to, an electronic, optical, magnetic, or other storage or transmission device capable of providing the processor 110 with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor 110, and the processing, described may be in one or more structures, and may be dispersed through one or more structures.

The system 100 is able to communicate with and/or receive communications from a network using a network interface 122. In some embodiments, network interface 122 is an Ethernet card. In other embodiments, network interface 122 is a module for receiving and decoding cable TV and/or satellite TV signals housed within an A/V receiver, a cable TV set-top box, a satellite TV set-top box, a television, or another component of a system 100. However, in embodiments of the present invention, network interface 122 may be any component that allows communication with a network. For example, network interface 122 may be a wireless networking device, or a module and antenna for communication with a cellular network or a Wi-Fi network.

Referring still to FIGS. 1A and 1B, the system 100 also comprises a user input device 114 in communication with the processor 110. For example, in some embodiments the user input device 114 may comprise a touchscreen. In such an embodiment, user input device 114 may sense user interaction as well as the location of the interaction. One such embodiment comprises a capacitance-based touchscreen. In other embodiments, user input device 114 may comprise a button, switch, slider, or trackball. In still other embodiments, the system 100 may comprise both a touch screen and an additional user input device 114.

In some embodiments, the user input device 114 may comprise a remote control, gaming controller, or similar device in communication with processor 110 by way of a wired or a wireless connection (e.g., infrared, Bluetooth, Zigbee, or any other wireless communications technology). On such embodiment comprises a remote control for an audio/video receiver that communicates with the audio/video receiver using Bluetooth.

The system 100 also comprises a display 116. Display 116 is in communication with processor 110 and is configured to display output from the processor 110 to the user. In one embodiment, the display 116 comprises a television. In another embodiment, the device 102 comprises a liquid crystal display (LCD) disposed beneath the user input device 114. In some embodiments, the display 116 and user input device 114 may comprise a single, integrated component, such as a touch-screen LCD. In some embodiments, device 102 may not comprise a display.

In the embodiment shown in FIGS. 1A, 1B and 2, haptic output devices 118 and are in communication with the processor 110 and are configured to provide one or more haptic effects. For example, in one embodiment, when an actuation signal is provided to haptic output device 118 by the processor 110, the respective haptic output device(s) 118, output a haptic effect based on the actuation signal. For example, in the embodiment shown, the processor 110 is configured to transmit a haptic output signal to haptic output device 118 comprising an analog drive signal. In some embodiments, the processor 110 is configured to transmit a command to haptic output device 118, wherein the command includes parameters to be used to generate an appropriate drive signal to cause the haptic output device 118 to output the haptic effect. In other embodiments, different signals and different signal types may be sent to each of one or more haptic output devices. For example, in some embodiments, a processor may transmit low-level drive signals to drive a haptic output device to output a haptic effect. Such a drive signal may be amplified by an amplifier or may be converted from a digital to an analog signal, or from an analog to a digital signal using suitable processors or circuitry to accommodate the particular haptic output device being driven.

A haptic output device, such as haptic output device 118, can be any component or collection of components that is capable of outputting one or more haptic effects. For example, a haptic output device can be one of various types including, but not limited to, an eccentric rotational mass (ERM) actuator, a linear resonant actuator (LRA), a piezoelectric actuator, a voice coil actuator, an electro-active polymer (EAP) actuator, a memory shape alloy, a pager, a DC motor, an AC motor, a moving magnet actuator, an E-core actuator, a smartgel, an electrostatic actuator, an electrotactile actuator, a deformable surface, an electrostatic friction (ESF) device, an ultrasonic friction (USF) device, or any other haptic output device or collection of components that perform the functions of a haptic output device or that are capable of outputting a haptic effect. Multiple haptic output devices or different-sized haptic output devices may be used to provide a range of vibrational frequencies, which may be actuated individually or simultaneously. Various embodiments may include a single or multiple haptic output devices and may have the same type or a combination of different types of haptic output devices. In some embodiments, one or more haptic output devices are directly or indirectly in communication with electronic device, such as via wired or wireless communication. In one embodiment, the electronic device can be placed in a vehicle or is integrated into a vehicle and one or more haptic output devices are embedded into the vehicle. For example, one or more haptic output devices may be embedded in a seat, steering wheel, pedal, etc. of the vehicle. In some embodiments, instead of having haptic output device 118 or in addition to having haptic output device 118, the system 100 has one or more other output devices. For example, system 100 may have a speaker and/or a display. In one embodiment, the system 100 has one or more haptic output devices, one or more speakers, and one or more displays. Numerous other embodiments are disclosed herein and variations are within the scope of this disclosure.

In various embodiments, one or more haptic effects may be produced in any number of ways or in a combination of ways. For example, in one embodiment, one or more vibrations may be used to produce a haptic effect, such as by rotating an eccentric mass or by linearly oscillating a mass. In some such embodiments, the haptic effect may be configured to impart a vibration to the entire electronic device or to only one surface or a limited part of the electronic device. In another embodiment, friction between two or more components or friction between at least one component and at least one contact may be used to produce a haptic effect, such as by applying a brake to a moving component, such as to provide resistance to movement of a component or to provide a torque. In order to generate vibration effects, many devices utilize some type of actuator and/or other haptic output device. Known haptic output devices used for this purpose include an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric, electro-active polymers or shape memory alloys.

In other embodiments, deformation of one or more components can be used to produce a haptic effect. For example, one or more haptic effects may be output to change the shape of a surface or a coefficient of friction of a surface. In an embodiment, one or more haptic effects are produced by creating electrostatic forces and/or ultrasonic forces that are used to change friction on a surface. In other embodiments, an array of transparent deforming elements may be used to produce a haptic effect, such as one or more areas comprising a smartgel. Haptic output devices also broadly include non-mechanical or non-vibratory devices such as those that use electrostatic friction (ESF), ultrasonic surface friction (USF), or those that induce acoustic radiation pressure with an ultrasonic haptic transducer, or those that use a haptic substrate and a flexible or deformable surface, or those that provide projected haptic output such as a puff of air using an air jet, and so on. In some embodiments, a haptic effect is a kinesthetic effect. U.S. patent application Ser. No. 13/092,484 describes ways that one or more haptic effects can be produced and describes various haptic output devices. The entirety of U.S. patent application Ser. No. 13/092,484, filed Apr. 22, 2011, is hereby incorporated by reference.

It will be recognized that any type of input synthesis method may be used to generate an interaction parameter for one or more haptic effect signals including, but not limited to, the method of synthesis examples listed in TABLE 2 below. A drive signal may be applied to a haptic actuator according to the interaction parameter. Numerous other embodiments are disclosed herein and variations are within the scope of this disclosure.

Table 2—Methods of Synthesis

Additive synthesis—combining inputs, typically of varying amplitudes
Subtractive synthesis—filtering of complex signals or multiple signal inputs
Frequency modulation synthesis—modulating a carrier wave signal with one or more operators
Sampling—using recorded inputs as input sources subject to modification
Composite synthesis—using artificial and sampled inputs to establish a resultant "new" input Phase distortion—altering the speed of waveforms stored in wavetables during playback Waveshaping—intentional distortion of a signal to produce a modified result Resynthesis—modification of digitally sampled inputs before playback Granular synthesis—combining of several small input segments into a new input Linear predictive coding—similar technique as used for speech synthesis Direct digital synthesis—computer modification of generated waveforms Wave sequencing—linear combinations of several small segments to create a new input Vector synthesis—technique for fading between any number of different input sources Physical modeling—mathematical equations of the physical characteristics of virtual motion In further embodiments, one or more haptic output devices 118 may be used to implement a wearable haptic device (e.g. a wristband, belt, or shirt). In other embodiments, one or more haptic output devices 118 may be used to implement a haptically-enabled furniture such as a chair or a couch.

As mentioned above, in one embodiment system 100 of FIG. 1A may be a home entertainment system. For example, in one embodiment depicted by FIG. 1B, system 100 comprises a television (display 116), an A/V receiver 122, speakers 120, a remote control 114, and a haptically-enabled couch 124. The A/V receiver 122 comprises processor 110, memory 112, and memory 122. User input device 114 comprises a remote control in communication with the processor 110 of A/V receiver 122. A/V receiver operates to play multimedia content residing in memory 112 or multimedia content received through network interface 122. In one embodiment, playing multimedia content comprise processor 110 transmitting video signals to display 116 causing video to be displayed and audio signals to speakers 120 causing audio to be played as is well known in the art. In another embodiment, playing multimedia content further comprises transmitting haptic signals to haptic output devices 118 of haptically-enabled couch 124 to cause haptic effects to be output to viewers sitting thereon.

In further embodiments, system 100 may comprise sensors in communication with processor 110. In one embodiment, system 100 may be configured to use one or more sensors to detect viewer information. For example, system 100 may be configured to detect viewer location, position, movement, and/or viewer biometric information. For example, remote control 114 may comprise a proximity sensor configured to detect the distance of the remote control from A/V receiver 122. In one such embodiment, the remote control 114 is configured to communicate detected distance information to processor 110 of A/V receiver 122. In another embodiment, system 100 may further comprise a camera and software for determining viewer information based on video captured by the video camera. In another embodiment, wearable devices, (e.g. a wearable haptic device) comprise one or more proximity sensors configured to detect the distance of the viewer wearing the device from A/V receiver 122 and to communicate detected distance information to processor 110 of A/V receiver 122. In some embodiments, wearable devices of system 100 may comprise sensors configured to detect motion (e.g. an accelerometer) and to communicate detected motion to processor 110 of A/V receiver 122. Based on this information, processor 110 may determine the movement of a user of system 100 according to methods known by one of ordinary skill in the art. In another embodiment, the wearable devices of system 100 comprise sensors configured to detect biometric data of the wearer such as heart rate or body temperature. System 100 may then analyze the biometric data to determine the stress level of a viewer and/or involuntary bodily responses of the viewer to multimedia content being played.

In another embodiment, a piece of furniture (e.g. haptically-enabled couch 124) comprises sensors to detect the presence and movements of one or more users of system 100. For example, pressure sensors may be located at various positions on haptically-enabled couch 124 and configured to communicate detected pressure to processor 110 of A/V Receiver 122 permitting the system 100 to detect whether and how a user is sitting on the couch 124 as well as movements of the user based on changes in the pressure detected by the pressure sensors according to methods known by one of ordinary skill in the art. Furthermore, the present disclosure contemplates all sensors and methods known to those of ordinary skill in the art to detect position and/or movement of a user of system 100.

Complementary Information

Complementary information is now discussed with reference to FIGS. 2A-H. For the purposes of the present disclosure, complementary information is information corresponding to multimedia content (e.g., any audio and/or video signal, file, or other form of audio and/or video data). In some embodiments, the complementary information generally describes the multimedia content, such as subtitle data, closed caption data (which may include subtitle data), a script, or a metadata tag. In another embodiment, complementary information may be annotations or comments from viewers (e.g. comments posted by members of an on-line video website) about the video as a whole or applicable to particular times of the multimedia content. Complementary information may take many forms in different embodiments, and may include other types of information, such as title or chapter information. Complementary information is often included (embedded) with the multimedia content it describes in a single multimedia file, which in various embodiments may also be referred to as an A/V file, a video file, or an audio file.

Figure 2A:
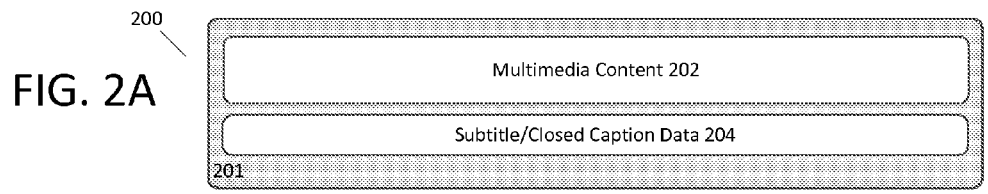
FIGS. 2A-H are block diagrams of multimedia data according to embodiments of the present disclosure.

FIG. 2A is a block diagram of multimedia data according to one embodiment of the present disclosure. In this embodiment, multimedia data 200 comprises a multimedia file 201. In the present embodiment, multimedia file 201 is a video file comprising multimedia content 202 (video) and complementary information in the form of subtitle/closed caption data 204 corresponding to the multimedia content 202. In one embodiment, subtitle/closed caption data 204 comprises text describing scenes and/or events visually depicted by multimedia content 202, text describing sounds heard in the audio of multimedia content 202, and/or textual quotes of audible speech in the audio of multimedia content 202.

Figure 2B:
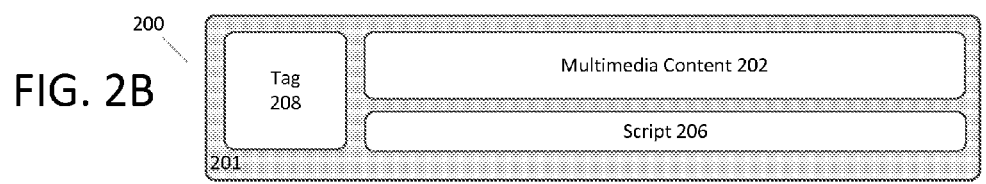

FIG. 2B is a block diagram of multimedia data according to one embodiment of the present disclosure. In this embodiment, multimedia data 200 comprises a multimedia file 201. In the present embodiment, multimedia file 201 is a video file comprising multimedia content 202 (video) and complementary information in the form of a tag 208 and a script 206 corresponding to the multimedia content 202. Tags for multimedia content may comprise title, artist/author, genre, length data, rating, and/or any other data describing the nature, content or origin of the multimedia content (e.g. reviews by critics or other viewers, list of songs used in a movie). One known example are ID3 tags—metadata containers often used with MP3 files. In one embodiment, tag data is defined by an author of the multimedia content. In another embodiment, tag data is defined by a distributor of the multimedia content. In still another embodiment, the tag data is defined by a purchaser and/or recipient of the multimedia content. In some such embodiments, the tag is generated by the author, distributor, and/or recipient.

Figure 2C:
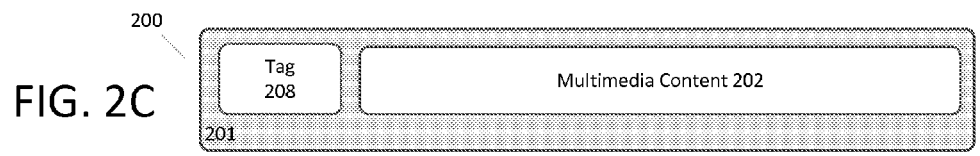

FIG. 2C is a block diagram of multimedia data according to one embodiment of the present disclosure. In this embodiment, multimedia data 200 comprises a multimedia file 201. In the present embodiment, multimedia file 201 is an audio file comprising multimedia content 202 (audio) and complementary information in the form of tag 208 corresponding to the multimedia content 202.

Figure 2D:
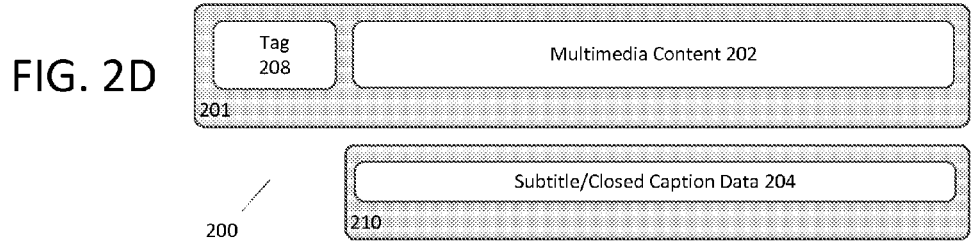

FIG. 2D is a block diagram of multimedia data according to one embodiment of the present disclosure. In this embodiment, multimedia data 200 comprises a multimedia file 201 and a complementary information file 210. In the present embodiment, multimedia file 201 is a video file comprising multimedia content 202 (video) and complementary information in the form of a tag 208 corresponding to the multimedia content 202. In the present embodiment, complementary information file 210 comprises complementary information in the form of subtitle/closed caption data 204 corresponding to multimedia content 202. In one embodiment, complementary information file 210 resides in the same memory as multimedia file 201 (e.g., memory 112). In another embodiment, the complementary information file 202 may reside on a remote server accessible by system 100 over a network, such as the Internet. In one embodiment, the complementary information file 210 corresponding to a multimedia file 201 is retrieved from a remote server based on information contained in tag 208 (e.g., movie name, song name, identification code, or any other identifying information).

Figure 2E:
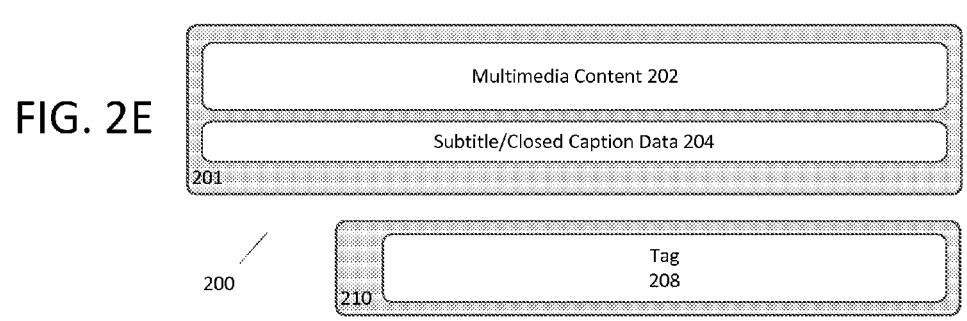

FIG. 2E is a block diagram of multimedia data according to one embodiment of the present disclosure. In this embodiment, multimedia data 200 comprises a multimedia file 201 and a complementary information file 210. In the present embodiment, multimedia file 201 is a video file comprising multimedia content 202 (video) and complementary information in the form of subtitle/closed caption data 204 corresponding to multimedia content 202. In the present embodiment, complementary information file 210 comprises complementary information in the form of tag data 208 corresponding to multimedia content 202. In one embodiment, complementary information file 210 resides in the same memory as multimedia file 201 (e.g., memory 112). In another embodiment, the complementary information file 202 may reside on a remote server accessible by system 100 over a network, such as the Internet. In one embodiment, the complementary information file 210 corresponding to a multimedia file 201 is retrieved from a remote server based on information in the multimedia file 201 (e.g. metadata, file name).

Figure 2F:
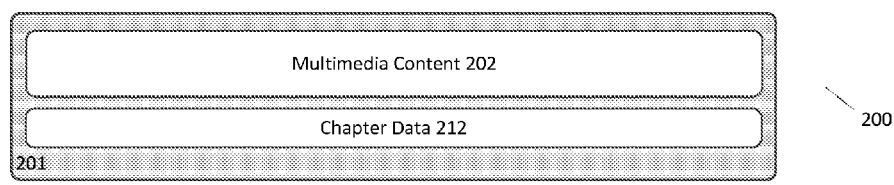

FIG. 2F is a block diagram of multimedia data according to one embodiment of the present disclosure. In this embodiment, multimedia data 200 comprises a multimedia file 201. In the present embodiment, multimedia file 201 is a video file comprising multimedia content 202 (video) and complementary information in the form of chapter data 212 corresponding to the multimedia content 202. In one embodiment, chapter data 212 comprises the titles of chapters of the multimedia content 202 and the times at which each chapter begins.

Figure 2G:
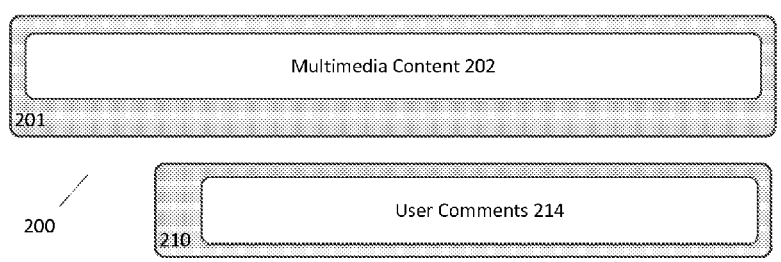

FIG. 2G is a block diagram of multimedia data according to one embodiment of the present disclosure. In this embodiment, multimedia data 200 comprises a multimedia file 201. In the present embodiment, multimedia file 201 is a video file comprising multimedia content 202 (video). In the present embodiment, complementary information file 210 comprises complementary information in the form of user comments 214 corresponding to the multimedia content 202. In one embodiment, complementary information file 210 resides in the same memory as multimedia file 201 (e.g., memory 112). In another embodiment, the complementary information file 202 may reside on a remote server accessible by system 100 over a network, such as the Internet. In one embodiment, the complementary information file 210 corresponding to a multimedia file 201 is retrieved from a remote server based on information in the multimedia file 201 (e.g. metadata, file name). In one embodiment, user comments 214 are comments from viewers (e.g. comments posted by members of an on-line video website) about the video as a whole or applicable to particular times of the multimedia content 202.

Figure 2H:
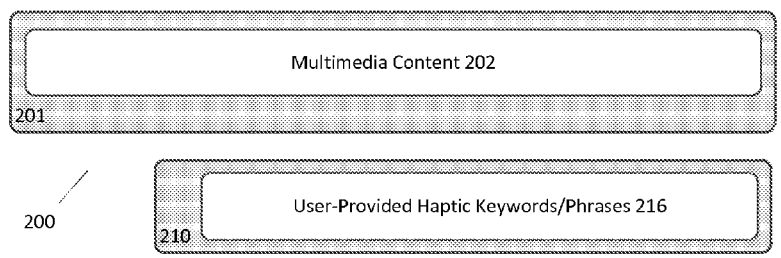

FIG. 2H is a block diagram of multimedia data according to one embodiment of the present disclosure. In this embodiment, multimedia data 200 comprises a multimedia file 201. In the present embodiment, multimedia file 201 is a video file comprising multimedia content 202 (video). In the present embodiment, complementary information file 210 comprises complementary information in the form of user-provided haptic keywords/phrases 216 corresponding to the multimedia content 202. In one embodiment, complementary information file 210 resides in the same memory as multimedia file 201 (e.g., memory 112). In another embodiment, the complementary information file 202 may reside on a remote server accessible by system 100 over a network, such as the Internet. In one embodiment, the complementary information file 210 corresponding to a multimedia file 201 is retrieved from a remote server based on information in the multimedia file 201 (e.g. metadata, file name). In one embodiment, user-provided haptic keywords/phrases 216 are provided by users of a website for improving or correcting the haptic tracks generated for the multimedia content 202. In one embodiment, the user-provided haptic keywords/phrases 216 apply to the multimedia content 202 as a whole. In another embodiment, the user-provided haptic keywords/phrases 216 apply to chapters or portions of the multimedia content 202. In still another embodiment, the user-provided haptic keywords/phrases 216 apply to specific points of time during playback of the multimedia content 202.

Operation of an Illustrative System

Figure 3:
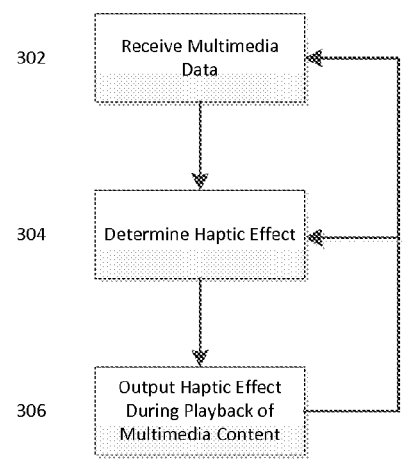
FIG. 3 is a flow diagram according to embodiments of the present disclosure.
Figure 4:
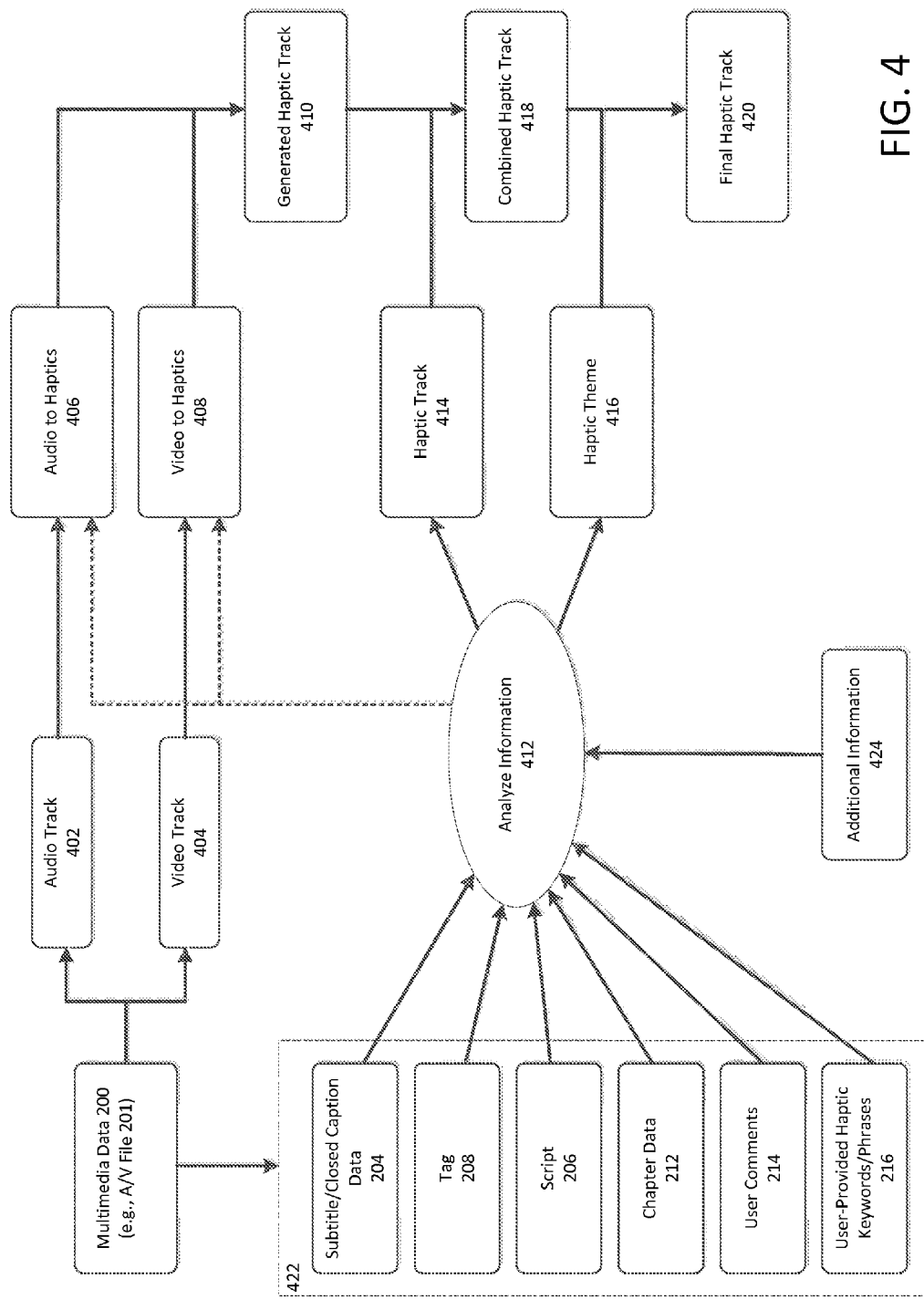
FIG. 4 is a flow diagram according to embodiments of the present disclosure.

FIG. 3 is a flow chart describing an exemplary embodiment for a method for providing haptic effects based on complementary information. FIG. 4, which is encompassed by step 304 of FIG. 3, is a flow chart describing an exemplary embodiment for a method for providing haptic effects based on complementary information. In some embodiments, the steps in FIGS. 3 and 4 may be implemented in program code that is executed by a processor, for example, the processor in a general purpose computer, a mobile device, or server. In some embodiments, these steps may be implemented by a group of processors, for example, a processor on a mobile device and processors on one or more general purpose computers, such as servers. To aid in understanding how each of the steps may be performed, the following description is provided in the context of the illustrative block diagrams of the system 100 shown in FIGS. 1A and 1B. However, embodiments according to the present disclosure may be implemented in alternative embodiments.

Beginning at step 302, the processor 110 of system 100 receives multimedia data 200. In one embodiment, the multimedia data 200 is a multimedia file 201 residing in memory 112 and the multimedia data 200 is received in response to an operating system operation (e.g., open/read commands issued to a file system). In another embodiment, the multimedia data 200 may be streamed over a network connection through network interface 122 and buffered at system 110. Embodiments of the present disclosure contemplate all network connections (e.g. Wi-Fi, Ethernet, wired modem, wireless modem, etc.) and sources and methods of streaming content known to those of ordinary skill in the art, including streaming from any number of servers over the Internet and streaming from a server within a corporate intranet or home network. In another embodiment, the multimedia data 200 is downloaded over a network, such as the Internet, and stored in memory 112.

In some embodiments, the multimedia content 202 and complementary information 422 (collectively, "multimedia data") are contained in a single file or data stream. However, in other embodiments, the multimedia content 202 and the complementary information 422 are separate files. As discussed above, in one such embodiment, the multimedia content 202 and the complementary information 422 reside in different locations. For example, in one embodiment, the multimedia content 202 may reside in memory 112 of system 100 while the corresponding complementary information 422 may reside at a server accessible on a network such as the Internet. At the time the multimedia content 202 is accessed for analysis and/or playback, the system 100 may retrieve the complementary information 422 from the server and load the complementary information into memory 112. In other embodiments, the multimedia content 202 and the complementary information 422 may reside at separate servers accessible through a network such as the Internet. In still further embodiments, the multimedia content 202 and complementary information 422 may reside as separate files on the same server. In one such embodiment, the system 100 receives the multimedia content 202 from a server by way of streaming and downloads the complementary information 422 from the server on which it resides. In still further embodiments, a multimedia file 201 comprises complementary information 422 and a corresponding complementary information file 210 comprises additional complementary information 422.

At step 304, haptic effects to be output during playback of the multimedia content 202 are determined based at least in part on the complementary information 422. According to the present disclosure, complementary information 422 may be used to determine haptic effects to be output during playback of multimedia content 202 using three primary techniques: 1) identifying haptic effects to be output based on keywords and phrases; 2) providing contextual information to algorithms/processes for automatically haptifying audio and/or video image; and 3) identifying a haptic theme based on the complementary information 422. In one embodiment, each of these techniques comprises analyzing complementary information 422 by comparing words and/or phrases therein to one or more lists or databases of keywords and/or phrases mapped to haptic effect identification information, context identification information, and/or haptic theme information (referred to hereinafter as "keyword database(s)"). In one embodiment, the list or database may contain information indicating whether particular keywords and/or phrases are applicable to all types of complementary information 422 (e.g., subtitle/closed caption data 204, scripts 206, and/or tags 208), or a subset thereof. In another embodiment, separate lists or databases of keywords or phrases applicable to particular types of complementary information 422 are used. For example, in one embodiment, a first database of keywords and/or phrases is used with respect to subtitle/closed caption data 204, and scripts 206, while a second database is used with respect to tags 208.

Identifying Predetermined Haptic Effects Based on Keywords/Phrases

In one embodiment, haptic effects are identified based on keywords/phrases present in the subtitle/closed caption data 204 or script 206. In one such embodiment, the subtitle/closed caption data 204 is analyzed at element 412. In one embodiment, the subtitle/closed caption data 204 and/or user-provided haptic keywords/phrases 216 are analyzed by comparing words and/or phrases to a keyword database. For example, in one such embodiment comparing the subtitle/closed caption data 204 and/or user-provided haptic keywords/phrases 216 to a keyword database reveals that "explosion" is present in each, and that it is mapped to haptic effect identification information for an intense vibration haptic that dissipates over time until the effect finishes (emulating an explosion). In another exemplary embodiment, comparing the subtitle/closed caption data 204 and/or user comments 214 to a keyword database reveals that "gunshot" is present in each, and that it is mapped to haptic identification information for an intense jolt haptic effect that is short in duration to mimic a gunshot. In another embodiment, the subtitle/closed caption data 204 comprises song titles/types playing in the background of different scenes—that may indicate the nature or genre of the scene—and comparing the song titles/types to a keyword database reveals mappings for each song title/type (or a subset thereof) mapped to haptic identification information for particular haptic effects. In some embodiments, these haptic effects mapping are selected in order to relay to the user the nature/genre of the scene. One of ordinary skill in the art would recognize that the words or phrases that may be used to identify haptic effects to be output during playback of a multimedia file 201 are not limited to the examples provided by the present disclosure, but rather extend to any number of words or phrases.

For each keyword or phrase found in a keyword database, the processor 110 retrieves the corresponding haptic effect identification information from the keyword database and associates it with a timestamp corresponding to the word or phrase in subtitle/closed caption data 204. In some embodiments, the processor 110 fully analyzes the complementary information 422 prior to playback of the multimedia content 202. In one such embodiment the processor 110 compiles the haptic effect identification information and corresponding timestamps into a haptic track 414 that is embedded into a multimedia file 201 comprising multimedia content 202 in any manner known to one having ordinary skill in the art. In another embodiment, the haptic track 414 is stored as a file separate from multimedia file 201 in a memory (e.g. memory 112). In other embodiments, especially where the processor 110 receives the multimedia content 202 through streaming, at element 412, the processor 110 analyzes the complementary information 422 during playback of the multimedia content and temporarily stores the haptic effect identification information (e.g., a partial haptic track 414) in a memory, such as memory 112. In one such embodiment, playback of the multimedia content 202 is delayed to sufficiently allow the processor to perform the analysis of the complementary information 422 and initiate the output of haptic effects in a timely manner during playback of the multimedia content 202.

In some embodiments, the method of identifying haptic effects identified based on keywords present in the subtitle/closed caption data 204 and/or script data 206 is the sole technique employed. In such embodiments, the applicable elements of FIG. 4 are multimedia data 200, complementary information 422, elements 412 and 414, and haptic track 418. As will be discussed in more detail below, in some embodiments two of the techniques may be used in conjunction and, in still further embodiments, all three of the techniques may be used in conjunction.

Providing Context to Automated Haptification Algorithms

In some embodiments, complementary information 422 is used to provide context to automated haptification algorithm(s), (such as one or more audio to haptics algorithms 406 and/or one or more video to haptics algorithms 408) for analyzing an audio track 402 and/or a video track 404 of multimedia content 202 to identify haptic effects to be output. In one embodiment, events, type of scene, and or presence of certain elements in a scene are determined based on the presence of keywords in complementary information 422. For example, in one embodiment, at element 412, the processor 110 searches one or more keyword databases for words or phrases contained in the complementary information 422 corresponding to a multimedia content 202. For each keyword or phrase found in the keyword database, the processor 100 retrieves the context identification information, associates it with a timestamp corresponding to the word or phrase in complementary information 422, if available, and provides it to one or more automated haptification algorithms (406 and or 408) by way of a data structure, function call, messaging, or any other means known to one having ordinary skill in the art. For example, in one such embodiment the word "bomb" in complementary information 422 is mapped to context identification information used for all types of explosions, thereby informing an automated haptification algorithm (406 and/or 408) to look for an explosion. In another exemplary embodiment, the word "crime" in a genre field of a tag 208 or the word "violence" in a rating field of a tag 208 embedded in the multimedia content 202 maps to context identification information used to instruct an automated haptification algorithm (406 and/or 408) to prioritize recognition of gunshots, events related to an automobile chases (e.g., squealing tires, collisions), and/or other crime related events. In another exemplary embodiment, the word "saxophone" in complementary information 422 is mapped to context identification information used to instruct an automated haptification algorithm (406 and/or 408) to prioritize recognition of a saxophone or similar instrument playing. In some embodiments, the detected keyword may be used to provide context to the automated haptification algorithms (406 and/or 408) for the full length of the multimedia content 202. In other embodiments, the detected key may be used to provide context to the automated haptification algorithms (406 and/or 408) for a subset of the multimedia content 202 (e.g. for a specific scene or scenes of a movie). Educating the automated algorithms with contextual information aids both processing efficiency and accuracy by prioritizing what patterns or events to look for in the audio and/or video. Accordingly, the timing and accuracy of the corresponding haptic effects output by the algorithm based on its recognition of events is also improved. One of ordinary skill in the art would recognize that the words or phrases that may be used to provide context to automated haptification algorithms are not limited to the examples provided by the present disclosure, but rather extends to any words or phrases that may provide clues as to what events or elements are present in the multimedia content 202.

In some embodiments, the processor 110, at element 412, fully analyzes the complementary information 422 to determine context identification information and then executes automated haptification algorithms 406 and/or 408 using the context identification information to process the audio track 402 and/or video track 404 to generate haptic track 410 prior to playback of the multimedia content 202. In one such embodiment, the processor 110 embeds the haptic track 410 generated by the automated haptification algorithm(s) a multimedia file 201 comprising the multimedia content 202 in any manner known to one having ordinary skill in the art. In another embodiment, the haptic track 410 is stored as a file separate from multimedia file 201 in a memory (e.g. memory 112). In other embodiments, especially where the processor 110 receives the multimedia content 202 through streaming, the processor 110 analyzes the complementary information 422 and executes the automated haptification algorithm(s) (406 and/or 408), as described above, during playback of the multimedia content 202 and temporarily stores generated portions of the haptic track 410 in a memory, such as memory 112. In one such embodiment, playback of the multimedia content 202 is delayed to sufficiently allow the processor 110 to perform the analysis of the complementary information 422 and execution of the automated haptification algorithm(s) (406 and/or 408), as described above, in order to generate portions of the haptic track 410 in time to initiate the output of haptic effects in a timely manner during playback of the multimedia content 202.

In some embodiments, the contextual information derived from the complementary information 422 is used to avoid haptifying or to attenuate the intensity of haptic effects corresponding to certain events for which haptification is not desired. For example, in some embodiments the presence of "laughter" in subtitle/closed caption data 204 is used to inform one or more automated haptification algorithms (406 and/or 408) to look for laughing or chuckling and avoid causing a haptic effect to be output for that event. Similarly, in another embodiment the presence of "music" in the subtitle/closed caption data 204 is used to inform one or more automated haptification algorithms (406 and/or 408) to look for playing of various instruments and/or singing and to avoid causing the output of corresponding haptic effects. In another embodiment, a list of songs in a tag 208 is used to inform automated haptification algorithm 406 to look for and avoid haptifying the playback of the listed songs.

In some embodiments, the method of analyzing complementary information 422 to provide context identification information to one or more automated haptification algorithm(s) (406 and/or 408), is the sole technique employed. In such embodiments, the applicable elements of FIG. 4 are multimedia data 200 (including audio track 402 and/or video track 404), complementary information 422, one or more of automated haptification algorithms (406 and/or 408), element 412, and haptic track 410.

In some embodiments, both the technique of identifying haptic effects to be output based directly on keywords and the technique of providing contextual information derived from complementary information 422 to automatic haptification algorithms (406 and/or 408) for automatic generation of a haptic track are employed. In one such embodiment, the processor 110 combines automatically generated haptic track 410 and haptic track 414 to produce combined haptic track 418. In one such embodiment, processor 110 operates to insert directly derived haptic effects from haptic track 414 into haptic track 410, and if necessary remove conflicting auto-generated haptic effect from the automatically generated haptic track 410, resulting in combined haptic track 418.

Haptic Themes

In some embodiments, complementary information 422 is used to determine a haptic theme to be applied to the haptic effects output during playback of a multimedia content 202 or to be applied to a certain scene or portion thereof. For example, in one embodiment the processor 110, at element 412, searches one or more keyword databases words or phrases contained in the complementary information 422 for a multimedia content 202. For each keyword or phrase found in the keyword database, the processor 110 retrieves the haptic theme information from the keyword database and correlates it to the entirety or specific scenes of the multimedia content, thereby generating the one or more haptic themes 416 to be applied. For example, in one embodiment, comparing the genre field of a tag 208 to a keyword database reveals that "Action" is present in each, and that it is mapped to haptic theme information dictating that the overall intensity or library of haptic effects output during the playback of a video is increased over a default level. In another exemplary embodiment, comparing a script 206 to a keyword database reveals that the phrase "I love you" is present in each, and that it is mapped to haptic theme information dictating that the overall intensity of haptic effects output during the playback of a video is decreased under a default level. In another embodiment, comparing chapter data 212 to a keyword database reveals the phrase "celebration" is present in the title of chapter 1 and the keyword database, and that it is mapped to haptic theme information dictating that the overall intensity of haptic effects output during the playback of a video is increased slightly over a default level during playback of chapter 1 of the multimedia content 202. In one embodiment, identified haptic themes 416 are applied to the combined haptic track 418 to generate final haptic track 420. In other embodiments, one or more identified haptic themes 416 may be applied to a haptic track generated by only using one of the two techniques previously described. In such embodiments, one or more identified haptic themes 416 are applied to haptic track 414 or haptic track 410 to generate final haptic track 420. In one embodiment, the processor 110 embeds the final haptic track 420 into multimedia data 200 comprising multimedia content 202 in any manner known to one having ordinary skill in the art. In another embodiment, the haptic track 420 is stored as a file separate from multimedia file 201 in a memory (e.g. memory 112). In some embodiments involving streaming, an identified haptic theme 416 is applied to portions of the haptic track as they are generated.

Identification and application of haptic themes 416 according to the present disclosure assists automated haptification algorithms (406 and/or 408) in providing haptic effects more accurately tailored to the multimedia content. In some embodiments, however, certain keywords may be prioritized over an identified haptic theme. For example, in one embodiment, the intensity of a haptic effect output based on the presence of "explosion" in the closed caption information of a multimedia file may be increased above a default intensity, thereby overriding application of a haptic theme that is softening the intensity of haptic effects based on the presence of "romantic comedy" in the genre field of a metadata tag embedded in the multimedia content. One of ordinary skill in the art would recognize that the words or phrases that may be used to determine an appropriate haptic theme are not limited to the examples provided by the present disclosure, but rather extends to any words or phrases that may provide clues as to what events or elements are present in the multimedia content.

The first two techniques of determining haptic effects based on complementary information 422 discussed above may be used alone or in combination, while the technique employing haptic themes may be used in conjunction with either or both of the first two techniques, or in conjunction with any other techniques that identifies haptic effects to be output during playback of multimedia content 422. For example, in one embodiment complementary information 422 is generally used to provide context to an automated haptification algorithm (406 and/or 408) employing pattern recognition techniques to the audio and/or video tracks, but for a small set of keywords present in closed caption data particular haptic effects are caused to be output based solely on the presence of those keywords in the complementary information.

At step 306, haptic effects are output during playback of the multimedia content 202. In one embodiment, a haptic track (e.g., 410, 414, 418, or 420) generated in the steps above comprises data structures defining the haptic effect to be output by haptic output device 118. In another embodiment, the haptic track (e.g., 410, 414, 418, or 420) contains haptic effect codes and the processor 110 uses the haptic effect codes to look up data structures defining the haptic effects in a haptic effect database stored in memory 112. In such embodiments, processor 110 transmits a signal to drive haptic output device 118 based on the haptic effect definitions in such data structures. In another embodiment, the haptic accessory incorporating one or more haptic output devices 118 (e.g. haptic furniture, wearable haptic device) comprises a processor and a memory comprising a database mapping haptic effect identification codes to data structures defining haptic effects. In one such embodiment, processor 110 transmits haptic effect codes to the processor of the haptic accessory, and then that processor uses the haptic effect codes to look up data structures defining the haptic effects and transmits a signal to drive haptic output device 118 based on the haptic effect definitions in such data structures.

Commentary Audio Tracks

In some cases, movies, documentaries and other video content have associated commentary audio tracks that may be played simultaneously with the video in which directors, actors, and/or others discuss the video. In one embodiment of the present disclosure, commentary audio tracks are another type of complementary information 422 on which a determination of a haptic track 420 may be based. In one such embodiment, an associated commentary audio track has its own subtitle/closed caption information that is used to determine haptic effects to be provided in a manner similar to that described above with respect to subtitle/closed caption data 204. In another embodiment, subtitle/closed caption data for a commentary audio track is not available and system 100 processes the commentary audio track to generate a textual version of the commentary audio track, in any manner known to those having skill in the art, that is then used to determine haptic effects to be provided in a manner similar to that described above with respect to subtitle/closed caption data 204.

Advanced Methods for Providing Haptic Effects Based on Complementary Information In addition to embodiments of the present disclosure set forth above that generally describe matching keywords or phrases to in complementary information 422 to identify predetermined haptic effects, to provide context to automated haptification algorithms, and/or identify one or more haptic themes to be applied, additional techniques may be used in conjunction with, or independent of, the methods described above to increase accuracy of the generated haptic track 420. In one embodiment, the presence of a keyword/phrase in subtitle/closed caption data 204 at element 412 is ignored if it is present in textual quotes of audible speech corresponding to the audio of multimedia content 202, but is relied upon, as described in the sections above, to identify a predetermined haptic effect, to provide context to an automated haptification algorithm, and/or identify a haptic theme if it is present in text describing events visually depicted by multimedia content 202. For example, in one embodiment the presence of the word "explosion" in textual quotes of subtitle/closed caption data 204 is ignored because it is unlikely for there to be an explosion at the time that a person is speaking the word "explosion." But if "explosion" is present in text of subtitle/closed caption data 204 describing scenes or events of the multimedia content 202, its presence is used to identify a predetermined haptic effect, to provide context to an automated haptification algorithm, and/or identify a haptic theme as described in the sections above. Whether to ignore or rely on the presence of a keyword/phrase in any of the types of complementary information 422 described herein, may be determined in any manner known to one of ordinary skill in the art. For example, the database(s) of keywords/phrases described above may specify ignoring the presence of certain keywords/phrases for certain types and/or sub-types of complementary information 422 (e.g. textual descriptions and textual quotes of subtitle/closed caption data 204) and when to rely on the presence of certain keywords/phrases for certain types and/or sub-types of complementary information 422.

In another embodiment, the presence of a keyword/phrase in complementary information 422 may be weighted based on the type or sub-type of complementary information 422 in which it is found. In one embodiment, weighting is used by processor 110 to prioritize the insertion of one haptic effect over another into a haptic track 414 when the processes described above result in multiple haptic effects to be output at the same time, or close in time such that the haptic effects will overlap and interfere with one another. For example, in one embodiment the presence of "bomb" in a textual quote in subtitle/closed caption data 204 is given a low weight and the presence of "cheering" in a textual description of a scene/event in subtitle/closed caption data 204 is given a high weight. In one such an embodiment, the complementary information 422 comprises subtitle/closed caption data 204 containing a textual description "Crowd cheering" and a textual quote "Dan Marino throws a bomb; touchdown Dolphins!" at contemporaneous times in the subtitle/closed caption data 204. The processor 110 operates as described above to identify predetermined haptic effects, to provide context to automated haptification algorithms, and/or identify haptic themes based on the presence of "bomb" and "cheering" but prioritizes the haptic effect, context, and/or haptic theme associated with "cheering" in the textual description in the subtitle/closed caption data 204 based on it having a higher weight. The weight assigned to the presence of a keyword/phrase in any of the types of complementary information 422 described herein may be determined in any manner known to one of ordinary skill in the art. For example, the database(s) of keywords/phrases described above may specify weights for certain keywords/phrases in certain types and/or sub-types of complementary information 422 (e.g. textual descriptions and textual quotes of subtitle/closed caption data 204).

In another embodiment, known natural language analysis techniques are used by processor 110 to improve the correlation of the haptic track 420 to the events of the multimedia content 202. For example, in one embodiment known algorithms for natural language analysis are used to interpret phrases in subtitle/closed caption data 204 to ascertain actual meanings with greater accuracy by taking into account syntax and semantics of the phrase. For example, the processor 110 applies natural language analysis techniques to analyze the phrase "there is no bomb" in subtitle/closed caption data 204 and, understanding the real meaning of the phrase, determines that the presence of "bomb" should not be compared to the database(s) of keywords and phrases to identify a predetermined haptic effect corresponding to "bomb." However, the processor 110 may determine that presence of a discussion regarding a "bomb" in the subtitle/closed caption data 204 is indicative of a genre of the multimedia content, such as war or action, and select an appropriate haptic theme. In another embodiment, processor 110 applies natural language analysis techniques to analyze the phrase "the bomb will explode in 3, 2, 1 . . . " in subtitle/closed caption data 204 and, recognizing the countdown in the phrase, operates to insert a predetermined haptic effect corresponding to "bomb" into a haptic track 420 at a precise time or to provide context identification information to an automatic haptification algorithm (406 and/or 408) for a precise time based on the phrase. The foregoing are but a few examples of using natural language analysis techniques to analyze complementary information 422. One of ordinary skill in the art would recognize numerous applications for using natural language analysis techniques in the context of the present disclosure.

In some instances, matching keywords or phrases in complementary information 422 to identify predetermined haptic effects, to provide context to automated haptification algorithms, and/or identify one or more haptic themes to be applied may suffer from inaccuracy due to some words or phrases having multiple possible meanings in a particular language. In one embodiment, subtitle/closed caption information 204 comprises subtitle and/or closed caption information in multiple languages (e.g., English, Spanish, and French) and such an ambiguity for a word/phrase in a first language (e.g., English) is resolved by analyzing the word/phrase in one or more of the other available languages (e.g., Spanish, French) where the word/phrase in one of the other languages generally has one accepted meaning. In one embodiment, this disambiguation method may be implemented by flagging ambiguous words/phrases in each language as ambiguous in the keyword database(s) for that language. In one such embodiment, upon determining that a keyword database indicates that a word/phrase in a language is ambiguous, system 100 would analyze the corresponding word/phrase in a second language to attempt to resolve the ambiguity. For example, in one embodiment subtitle/closed caption data 204 comprises English, French, and Spanish closed captions. In this embodiment, processor 110 compares English closed caption text to a keyword database and finds the word "tie" is present in the closed caption text and in the keyword database, but is flagged as an ambiguous word. Based on "tie" being flagged as ambiguous, the processor 110 analyzes the French closed caption text around the same time stamp in the multimedia content 202 that "tie" appeared in order to determine its meaning. In one embodiment, this analysis comprises looking for French synonyms of various meanings of "tie" that, once identified in the French closed captions, will indicate which meaning of the word "tie" is correct. For example, the analysis might identify the French word "cravate," which means necktie, or the French word "match nul," which means tie game. Once the disambiguation of "tie" is complete, the methods described above may be used to identify a predetermined haptic effect, provide context to automated haptification algorithms, and/or identify one or more haptic themes to be applied. For example, a haptic theme appropriate for sporting events may be applied based on the presence of "match nul." One of ordinary skill in the art would recognize that this is but one of numerous possible examples.

Remote Generation of Haptic Tracks

While the embodiments of the present disclosure set forth above generally describe processor 110 of system 100 performing the analysis of the multimedia content 202 and corresponding complementary information 422 to generate a haptic track (e.g., 410, 414, 418, or 420), in other embodiments the analysis and generation of a haptic track (e.g., 410, 414, 418, or 420) may be performed by a another computer or server in communication with processor 110 through a network, such as the Internet. In one such embodiment, the remote computer or server embeds the haptic track (e.g., 410, 414, 418, or 420) into a multimedia file 201. Processor 110 of system 100 then downloads the multimedia file 201 containing the haptic track and outputs haptic effects while playing the multimedia content 202 as described above in relation to step 306 of FIG. 3. In another embodiment, the remote computer stores the haptic track (e.g., 410, 414, 418, or 420) as a file separate from multimedia file 201 locally in a memory of the remote computer. In another embodiment, the remote computer transmits the haptic track (e.g., 410, 414, 418, or 420) to a second remote computer where it is stored as a file separate from multimedia file 201. In such embodiments, processor 110 of system 100 downloads the haptic track (e.g., 410, 414, 418, or 420) from the remote computer on which it is stored and outputs haptic effects while playing the multimedia content 202 corresponding to the haptic track as described above in relation to step 306 of FIG. 3.

Pre-Generation of Haptic Tracks

While the embodiments of the present disclosure described above generally describe generating haptic tracks when a user plays multimedia content, in other embodiments haptic tracks are generated according to this disclosure when multimedia content is downloaded to system 100, but before playback. In another embodiment, haptic tracks are generated according to this disclosure by a creator or distributor of multimedia content prior to making the content available for use.

Providing Haptic Effects Based on Viewer Information

While the embodiments of the present disclosure above describe providing haptic effects based on complementary information 422 for a multimedia content 202, in other embodiments the generated haptic track 420 is further based on viewer position, posture, reaction, and biometrics (represented by additional information 424) analyzed at element 412. Viewer information may be determined using one or more of the sensors described above with respect to system 100.

In one embodiment, a haptic theme modulating the output level of haptic effects to be above or lower than a default level is determined based on a viewer's proximity to an output source for the playback of the multimedia content 202 (e.g. A/V receiver 122, display 116 and/or speakers 120 of system 100). For example, in one embodiment, if a viewer's proximity is approximately 10 feet from the output source for the playback of the multimedia content, no haptic theme is selected. However, if the viewer's proximity to the output source is approximately 9 feet, a haptic theme specifying an output level for the haptic effects above the default level is selected. As the proximity of the viewer to the output source grows smaller, the greater the modulation of the output level of the haptic effects that is specified by the haptic theme selected. On the other hand, if the viewer's proximity to the output source is approximately 9 feet, a haptic theme specifying an output level for the haptic effects below the default level is selected. And as the proximity of the viewer to the output source increase, the lower the modulation of the output level of the haptic effects that is specified by the haptic theme selected.

In a similar embodiment, a haptic theme modulating the output level of haptic effects to be above or lower than a default level is determined based on a viewer's viewing angle to an output source for the playback of the multimedia content 202 (e.g. display 116 of system 100). For example, in one embodiment, if a viewer's viewing angle is approximately 90° with respect to the output source for the playback of the multimedia content (directly in front), haptic effects are output at their maximum level according to the haptic track 420. However, as a viewer's viewing angle to the output source moves closer to 0°, the haptic effects specified by a haptic track 420 are modulated to a lower output level.

In another embodiment, a viewer's position, posture and or movement is used to determine a haptic theme. For example, in one embodiment a haptic theme for horror or action movie is selected based on a viewer covering his/her eyes. In another embodiment, a haptic theme for a romantic comedy is selected based on a couple sitting close to each other in a relaxed manner and smiling.

In still another embodiment, viewer biometric information is used to select a theme. For example, in one embodiment a haptic theme corresponding to an action movie is selected based on a viewer having an elevated heart rate indicating stress and/or excitement. In another embodiment, a haptic theme modulating the haptic effects to a lower level is selected where viewer heart rates indicate the viewer is relaxed.

Video Games

In one embodiment, multimedia content 202 comprises audio and/or video output during playing of a video game. For example, in one embodiment a video game comprises multimedia content 202 in the form of a video sequence and complementary information 422 comprising any of the types discussed above in relation to multimedia content comprising video (e.g. subtitle/closed caption data 204 corresponding to the video sequence). Accordingly, the embodiments for providing haptic effects based on complementary information 422 discussed above also apply to video games. However, in further embodiments other information (represented by additional information 424) may be used independently, or in addition to complementary information 422 discussed in the embodiments above, to identify haptic effects to be output.

In one embodiment, system 100 is configured to execute video game programs and provides an application program interface that video game programs may call to initiate playback of an audio file ("Audio API"). In one such embodiment, a textual identifier (e.g., a file name) of the audio file requested for playback through the Audio API ("file name data") is provided to the Audio API. In one embodiment, system 100 at element 412 may analyze the filename data to 1) identify haptic effects to be output based on keywords; 2) provide contextual information to algorithms/processes for automatically haptifying audio and/or video image; and 3) identify a haptic theme in a similar manner to that described above with respect to various types of complementary information 422. For example, in one embodiment the file name data is analyzed by comparing words in the file name data to a keyword database at element 412. In one such embodiment, the file name data comprises the text "thunder.mp3" and comparing the "thunder" to a keyword database reveals that "thunder" is present therein and that it is mapped to haptic effect identification information for an intense pulsating vibration haptic (emulating thunder). In another exemplary embodiment, the file name data comprises the text "scream.mp3" and comparing "scream" to a keyword database reveals that "scream" is present therein and that it is mapped to context identification information used to instruct an automated haptification algorithm (406 and/or 408) to prioritize recognition of screams, shrieks, and other sounds commonly associated with a scary scene. In another embodiment, comparing "scream" (from "scream.mp3") to a keyword database reveals that "scream" is present in each, and that it is mapped to haptic theme information dictating that the overall intensity or library of haptic effects output during the playback of a video is increased over a default level as appropriate for a scary video sequences.

In another embodiment, system 100 provides an application program interface that video game programs may call to cause text displayed on screen during a video game to be output as audio ("Text-to-Speech API"). In one such embodiment, the text displayed on the screen (e.g., instructions, signs or other text displayed in the video game scene, comic-style action indicators such as "BAM" and "THWACK") is provided to the Text-to-Speech API. In one embodiment, system 100 may analyze at element 412 the displayed to 1) identify haptic effects to be output based on keywords; 2) provide contextual information to algorithms/processes for automatically haptifying audio and/or video image; and 3) identify a haptic theme based on in a similar manner to that described above with respect to various types of complementary information 422 (e.g., subtitle/closed caption data 204).

General

The foregoing description of some embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the invention.

Reference herein to "one embodiment" or "an embodiment" means that a particular feature, structure, operation, or other characteristic described in connection with the embodiment may be included in at least one implementation of the invention. The invention is not restricted to the particular embodiments described as such. The appearance of the phrase "in one embodiment" or "in an embodiment" in various places in the specification does not necessarily refer to the same embodiment. Any particular feature, structure, operation, or other characteristic described in this specification in relation to "one embodiment" may be combined with other features, structures, operations, or other characteristics described in respect of any other embodiment.

We claim:

1. A method comprising:
   receiving, by a processor, a data stream comprising an audio track and a metadata container comprising haptic-effect data, the haptic-effect data being information usable to generate or modify one or more haptic effects;
   determining, by the processor, a haptic effect based on the audio track;
   determining, by the processor, a modified version of the haptic effect based on the haptic-effect data included in the metadata container; and
   transmitting, by the processor, a signal configured to cause a haptic output device to output the modified version of the haptic effect while playing the audio track.

2. The method of claim 1, wherein the metadata container comprises a field and the haptic-effect data is stored in the field.

3. The method of claim 1, wherein the metadata container comprises a haptic-effect code corresponding to one or more haptic effects in a database.

4. The method of claim 1, further comprising:
   synchronizing output of the haptic effect with an event in the audio track; and
   outputting the haptic effect concurrently with the event in the audio track.

5. The method of claim 1, wherein the haptic-effect data comprises at least one of a title, artist, author, genre, rating, review, list of songs, comment, chapter data, or song type.

6. The method of claim 1, further comprising:
   determining a haptic theme using the haptic-effect data; and
   generating the modified version of the haptic effect by modifying a characteristic of the haptic effect based on the haptic theme.

7. The method of claim 1, wherein the data stream further comprises a video track corresponding to the audio track and the metadata container.

8. A system comprising:
   a processing device; and
   a memory device on which instructions executable by the processing device are stored to cause the processing device to:
   receive a data stream comprising an audio track and a metadata container comprising haptic-effect data, the haptic-effect data being information usable to generate or modify one or more haptic effects;

determine a haptic effect based on the audio track;
determine a modified version of the haptic effect based on the haptic-effect data included in the metadata container; and
transmit a signal configured to cause a haptic output device to output the modified version of the haptic effect while playing the audio track.

9. The system of claim 8, wherein the metadata container comprises a field and the haptic-effect data is stored in the field.

10. The system of claim 8, wherein the metadata container comprises a haptic-effect code corresponding to one or more haptic effects in a database.

11. The system of claim 8, wherein the memory device further includes instructions executable by the processing device to cause the processing device to:
synchronize output of the haptic effect with an event in the audio track; and
cause the haptic effect to be output concurrently with the event in the audio track.

12. The system of claim 8, wherein the haptic-effect data comprises at least one of a title, artist, author, genre, rating, review, list of songs, comment, chapter data, or song type.

13. The system of claim 8, wherein the memory device further includes instructions executable by the processing device to cause the processing device to:
determine a haptic theme using the haptic-effect data; and
generate the modified version of the haptic effect by modifying a characteristic of the haptic effect based on the haptic theme.

14. The system of claim 8, wherein the data stream further comprises a video track corresponding to the audio track and the metadata container.

15. A non-transitory computer readable medium comprising processor-executable program code, which when executed by a processor is configured to cause the processor to:
receive a data stream comprising an audio track and a metadata container comprising haptic-effect data, the haptic-effect data being information usable to generate or modify one or more haptic effects;
determine a haptic effect based on the audio track;
determine a modified version of the haptic effect based on the haptic-effect data included in the metadata container; and
transmit a signal configured to cause a haptic output device to output the modified version of the haptic effect while playing the audio track.

16. The non-transitory computer readable medium of claim 15, wherein the metadata container comprises a field and the haptic-effect data is stored in the field.

17. The non-transitory computer readable medium of claim 15, wherein the metadata container comprises a haptic-effect code corresponding to one or more haptic effects in a database.

18. The non-transitory computer readable medium of claim 15, further comprising processor-executable program code executable by the processor to cause the processor to:
synchronize output of the haptic effect with an event in the audio track; and
cause the haptic effect to be output concurrently with the event in the audio track.

19. The non-transitory computer readable medium of claim 15, wherein the haptic-effect data comprises at least one of a title, artist, author, genre, rating, review, list of songs, comment, chapter data, or song type.

20. The non-transitory computer readable medium of claim 15, further comprising processor-executable program code executable by the processor to cause the processor to:
determine a haptic theme using the haptic-effect data; and
generate the modified version of the haptic effect by modifying a characteristic of the haptic effect based on the haptic theme.

* * * * *